US005118429A

United States Patent [19]

Anderson et al.

[11] Patent Number: 5,118,429

[45] Date of Patent: Jun. 2, 1992

[54] AMBIENT TEMPERATURE DESTRUCTION OF PCB WASTES

[75] Inventors: Perry D. Anderson, Lacolle; Bhuvan C. Pant, Roxboro; Zhendi Wang, Verdun; Cooper H. Langford, Montreal; Prasad Aysola, Greenfield Park, all of Canada

[73] Assignee: Concordia University, Montreal, Canada

[21] Appl. No.: 604,223

[22] Filed: Oct. 29, 1990

[51] Int. Cl.[5] .......... C02F 1/58; C02F 1/72

[52] U.S. Cl. .......... 210/758; 210/909

[58] Field of Search .......... 210/758, 759, 761-763, 210/908, 909, 754-756

[56] References Cited

U.S. PATENT DOCUMENTS

| | | | |
|---|---|---|---|
| 3,487,016 | 12/1969 | Zeff | 210/631 |
| 4,351,978 | 9/1982 | Hatano et al. | 210/909 |
| 4,416,786 | 11/1983 | Knorre et al. | 210/759 |
| 4,683,065 | 7/1987 | Sheikh | 210/754 |
| 4,693,832 | 9/1987 | Hurst | 210/756 |
| 4,696,749 | 9/1987 | Habermann et al. | 210/763 |
| 4,828,718 | 5/1989 | Habermann et al. | 210/763 |

*Primary Examiner*—Thomas Wyse
*Attorney, Agent, or Firm*—Foley & Lardner

[57] ABSTRACT

There is disclosed a process for destroying halogenated hydrocarbons such as PCBs and PCBs in PCB containing fluids (e.g., Askarel) and oils (e.g., paraffin oil, transformer oil, etc.) at ambient temperature. The process comprises reacting halogenated hydrocarbons, such as PCB containing fluids or oils with a solid oxidant in the presence of a concentrated acid. Preferably, the solid oxidant is potassium permanganate and the concentrated acid is sulfuric acid. Destruction efficiency is as high as 99.95%.

7 Claims, No Drawings

AMBIENT TEMPERATURE DESTRUCTION OF PCB WASTES

BACKGROUND OF THE INVENTION (a) Field of Invention

This invention relates to a process for destroying PCBs and PCBs in PCB containing fluids and oils using solid oxidants in the presence of a concentrated acid at ambient temperature.

(b) Description of the Prior Art

Polychlorinated biphenyls (PCBs) have been widely used as insulating materials in electrical equipment, heat exchange liquids, plasticizers and for other industrial applications. It has been determined, however, that PCBs and other polyhalogenated organic compounds are a source of ecological problems including toxic effects on humans, animals, vegetation, soil and air. As a result, the use of PCBs is now banned in many countries including Canada and the U.S. However, safe disposal of waste PCBs still remains a problem due to the very nature of halogenated hydrocarbons, i.e., high stability to chemical and biological degradation and production of toxic compounds.

A number of methods have been proposed to destroy polychlorinated biphenyls and other halogenated hydrocarbons. Some of the proposed methods employ a high temperature treatment and therefore carry the risk of air pollution due to the emission of noxious fumes and vapors in the environment. Also, incineration as a way to dispose of hazardous chemicals in general has a notable drawback in that it requires substantial energy consumption.

A number of patents exist on the decomposition reactions of halogenated organic compounds stimulated by the use of various forms of radiation, e.g., UV, microwave, solar energy, etc. (U.S. Pat. Nos. 4,345,983; 4,632,742; 4,432,344 and 4,549,528).

There is, however, still a need for a safe and efficient process for the destruction of halogenated or polyhalogenated hydrocarbons, where the risks associated with high temperature treatment would be eliminated.

SUMMARY OF THE INVENTION

According to this invention, there is provided a process for destroying halogenated hydrocarbons, such as PCBs and PCBs in PCB containing fluids and oils at ambient temperature. The process comprises reacting halogenated hydrocarbons, such as PCBs and PCBs containing fluids or oils with a solid oxidant in the presence of a concentrated acid.

The amount of solid oxidant, the volume of concentrated acid, the sequence of addition and the duration of the reaction are not critical. These parameters should only be so as to be sufficient to effect the total destruction of halogenated hydrocarbons, such as PCBs.

For the purpose of the present invention, the destruction of halogenated hydrocarbons, such as PCBs, will be understood to mean a process in which a cleavage of carbon-halogen bands takes place, thus practically eliminating all problems of toxicity.

DESCRIPTION OF PREFERRED EMBODIMENTS

The halogenated hydrocarbons, which are preferably destroyed by the process according to the invention, include a PCB, PCBs in fluids, such as Askarel, PCBs in paraffin oil and PCBs in transformer oil.

The preferred oxidant, which is used in the process according to the invention, consists of potassium permanganate, although oxides of manganese, chromium and vanadium, chromates and dichromates may also be used.

Although a large number of concentrated acids may be used, the preferred acid is concentrated sulfuric acid.

According to an embodiment of the invention, the halogenated hydrocarbons may be present in a solid, liquid or gaseous matrix, for reaction with the solid oxidant and concentrated acid.

According to another embodiment of the invention, the solid oxidant and the concentrated acid may be supported on a solid support, such as alumina, titania, silica, zeolites, clays, ceramics or the like.

The invention will now be illustrated by means of the following examples, which are not intended to limit the scope of the present invention.

The use of solid oxidants in cleaving carbon-halogen bonds is not limited to PCBs and hence the conditions and reagents discussed in examples can be applied to the destruction of halogenated organic compounds in general.

EXAMPLE 1

A sample of Askarel (0.11 g) was mixed with finely ground potassium permanganate (0.55 g) in a 250 ml Erlenmeyer flask. Concentrated sulfuric acid (5 ml) was then added to the mixture and the reaction was allowed to proceed over a total period of approximately 90 minutes. The reaction mixture was then extracted with n-hexane at room temperature. The destruction efficiency was determined by analyzing n-hexane extract using a gas chromatograph equipped with an electron capture detector. The destruction efficiency was found to be above 99.9%.

EXAMPLE 2

(In this and the following examples, the apparatus, reaction and analytical conditions were similar to Example 1, except where indicated.)

Askarel (0.1 g) was added to a mixture of potassium permanganate (0.5 g) and concentrated sulfuric acid (5 ml), over a period of approximately 40 minutes, with stirring. The destruction efficiency was 99.99%.

EXAMPLE 3

Potassium permanganate (2.2 g) was added to a stirred mixture of Askarel (0.4 g) in concentrated sulfuric acid (20 ml). The destruction efficiency was 99.99%.

EXAMPLE 4

Paraffin oil (0.17 g) spiked with ~500,000 ppm PCB was added dropwise to a stirred mixture of potassium permanganate (2.2 g) and concentrated sulfuric acid (20 ml) over a period of approximately 20 minutes. Contents were stirred for an additional 30 minutes at 60–65 degrees Celsius. The destruction efficiency was 99.95%.

EXAMPLE 5

Transformer oil (0.2 g) spiked with ~500,000 ppm PCB was added dropwise to a stirred mixture of potassium permanganate (2.2 g) and concentrated sulfuric acid (20 ml) over a period of approximately 30 minutes. Contents were stirred for an additional 50 minutes at 70 degrees Celsius. The destruction efficiency was above 99.95%.

EXAMPLE 6

Transformer oil (0.17 g) spiked with 5,000 ppm Aroclor 1254 was added dropwise to a stirred mixture of potassium permanganate (2.6 g) and concentrated sulfuric acid (20 ml) over a period of approximately 25 minutes. Contents were stirred for an additional 40 minutes at 70 degrees Celsius. The destruction efficiency was 99.95%.

It is evident, therefore, that the solid oxidant—potassium permanganate—in concentrated sulfuric acid at room temperature is effective in accomplishing a substantial and rapid destruction of PCBs and PCBs in PCB containing fluids and oils. The process according to the present invention, can also be used to destroy a variety of halogenated hydrocarbons beside PCBs. However, for each substance to be decontaminated, optimum amounts of the solid oxidant and the concentrated acid have to be adjusted with the type of halogenated hydrocarbon.

EXAMPLE 7

Askarel (0.1 g) was mixed with chromium dioxide (0.5 g) and concentrated sulfuric acid (5 ml). The mixture was maintained at 100 degrees Celsius for 30 minutes. The destruction efficiency was 99.99%.

It should also be noted that the destruction process of the invention is not limited to PCBs and PCBs in fluids or oils. Destruction of halogenated hydrocarbons, by the process according to this invention, may be carried out in diverse matrices such as liquids, solids (PCBs in soil or other types of solid wastes) and gases (PCBs and other halogenated hydrocarbons in air).

We claim:

1. Process for the destruction of PCBs, which comprises reacting said PCBs with an amount of a solid oxidant sufficient to destroy substantially all said PCBs, wherein said oxidant is selected from the group consisting of potassium permanganate, oxides of manganese, chromium and vanadium, chromates and dichromates, in the presence of a concentrated mineral acid at ambient temperature, until substantially all said PCBs have been destroyed.

2. Process according to claim 1, wherein said PCB's are selected from the group consisting of PCBs, PCBs in fluids, PCBs in paraffin oil and PCBs in transformer oil.

3. Process according to claim 1, wherein said solid oxidant comprises potassium permanganate.

4. Process according to claim 1, wherein the acid comprises sulfuric acid.

5. Process according to claim 1, wherein the PCB's are present in a solid, liquid or gaseous matrix, for reaction with said solid oxidant and said concentrated acid.

6. Process according to claim 1, wherein the solid oxidant and the concentrated acid are supported on a solid support.

7. Process according to claim 6, wherein said solid support is selected from the group consisting of alumina, titania, silica, zeolites, clays and ceramics.

* * * * *